United States Patent
Ikeda et al.

(10) Patent No.: US 7,054,090 B2
(45) Date of Patent: May 30, 2006

(54) DATA STORAGE DEVICE, RECORDING MEDIUM, SERVO WRITING METHOD, AND DATA READING/WRITING METHOD

(75) Inventors: Masaomi Ikeda, Yokohama (JP); Nobuyuki Kitazaki, Thigasaki (JP); Kenji Ogasawara, Fujisawa (JP); Atsushi Takeichi, Fujisawa (JP); Hirofumi Yanase, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 316 days.

(21) Appl. No.: 10/601,168

(22) Filed: Jun. 19, 2003

(65) Prior Publication Data
US 2004/0095671 A1 May 20, 2004

(30) Foreign Application Priority Data
Jun. 25, 2002 (JP) .............................. 2002-185284

(51) Int. Cl.
*G11B 21/02* (2006.01)
(52) U.S. Cl. ..................................... 360/75; 360/77.08
(58) Field of Classification Search ................. 360/75, 360/71, 48, 66, 77.02, 31, 78.04, 97.02, 236, 360/234.7, 77.08; 318/560; 369/44.26; 29/603.09
See application file for complete search history.

(56) References Cited

U.S. PATENT DOCUMENTS

| | | | | |
|---|---|---|---|---|
| 4,729,048 A * | 3/1988 | Imakoshi et al. | ........ | 360/234.7 |
| 5,065,382 A * | 11/1991 | Seko et al. | ............... | 369/44.26 |
| 5,072,317 A * | 12/1991 | Fukushima et al. | ........... | 360/71 |
| 5,570,247 A * | 10/1996 | Brown et al. | ................. | 360/75 |
| 5,719,719 A * | 2/1998 | Tsuyoshi et al. | .............. | 360/66 |
| 5,748,400 A * | 5/1998 | Flake et al. | .............. | 360/77.02 |
| 5,867,337 A * | 2/1999 | Shimomura | .................. | 360/75 |
| 5,949,603 A * | 9/1999 | Brown et al. | ................. | 360/75 |
| 6,040,955 A * | 3/2000 | Brown et al. | ................. | 360/75 |
| 6,061,195 A * | 5/2000 | Wilson et al. | ................ | 360/48 |
| 6,260,257 B1 * | 7/2001 | Emo et al. | ............... | 29/603.09 |
| 6,344,942 B1 * | 2/2002 | Yarmchuk | .................... | 360/75 |
| 6,611,395 B1 * | 8/2003 | Chainer et al. | ............... | 360/75 |
| 6,653,809 B1 * | 11/2003 | Nakatani | .................... | 318/560 |
| 6,728,070 B1 * | 4/2004 | Koishi | ........................ | 360/236 |
| 6,778,343 B1 * | 8/2004 | Nunnelley | .................... | 360/31 |
| 6,888,696 B1 * | 5/2005 | Yasuna et al. | ........... | 360/78.04 |
| 6,894,866 B1 * | 5/2005 | Nishijima et al. | ....... | 360/97.02 |

* cited by examiner

*Primary Examiner*—David Hudspeth
*Assistant Examiner*—Fred F. Tzeng
(74) *Attorney, Agent, or Firm*—Patrick W. Duncan

(57) ABSTRACT

Disclosed is a data storage device to provide servo patterns of a track pitch individually consistent with head characteristics (writing width, and reading width) in a recording medium of a hard disk device. The data storage device is provided with a disk having pitch information indicating a track pitch recorded in a predetermined area, and a head for scanning the disk to read the TPI ID and reading/writing data from/in the disk by being subjected to seeking control based on the TPI ID. The TPI ID is recorded as a part of a servo pattern in a TPI ID embedded area provided in an outer periphery of a data area of the disk.

9 Claims, 5 Drawing Sheets

DATA STORAGE DEVICE, RECORDING MEDIUM, SERVO WRITING METHOD, AND DATA READING/WRITING METHOD

BACKGROUND OF THE INVENTION

The present invention relates to a servo pattern formed in a recording medium of a data storage device and, more particularly to formation of a servo pattern by self-servo writing and a method for reading/writing data from/in the recording medium having the servo pattern.

In the data storage device in which the recording medium is scanned by a head and magnetic or optical means is used to read/write data from/in the recording medium, as means for increasing a recording density, servo writing is carried out to write a servo pattern used for positioning the head in the recording medium.

In a data storage device such as a hard disk device which uses a disk-like recording medium, tracks for recording data are concentrically set. Conventionally, in servo writing in the hard disk device, because of limitations or the like in a manufacturing process, a servo pattern has been written by a fixed track pitch.

However, in data writing by a head, a writing width varies in each product head. Thus, in the case of writing the servo pattern by a fixed track pitch, a track pitch must be decided on the assumption that a head of a large writing width is used. This is because of a possibility that if a track pitch is narrow with respect to a writing width of a head, data may be overwritten in an adjacent track during data writing to erase original data written therein.

As described above, servo patterns written in the disk-like recording medium (referred to as disk, hereinafter) are written at sufficient intervals by considering variance in writing width among the individual heads. As a result, waste spaces are generated in the data storage device having a head of a small writing width.

On the other hand, as means of replacing the conventional servo writing for writing the servo pattern in the disk by the fixed track pitch, a method is conceivable which uses a self-servo writing for executing servo writing by a head itself for reading/writing data from/in the disk to individually write servo patterns by a track pitch consistent with head characteristics. According to this method, since the servo writing can be carried out in accordance with the head characteristics (writing width, and reading width) of each product, it is possible to obtain a good servo pattern optimized for servo control of each product.

However, if the method for individually writing the servo patterns in the disk by the self-servo writing is utilized, since track pitches are individually set for the respective products, a problem is consequently created that to execute accurate seeking control, information regarding a track pitch (track per inch (TPI) information) intrinsic to each disk must be known beforehand.

A conceivable means for saving the TPI information intrinsic to the disk, for example, is writing of the TPI information as data in a data area of the disk itself. However, a seeking operation is executed with the TPI unknown until the head reaches an address in which the TPI information has been written. Consequently, an accurate operation cannot be expected.

Furthermore, as another means for saving the TPI information intrinsic to the disk, storage means such as an electrically erasable and programmable ROM (EEP-ROM) may be provided to save the information. However, in the manufacturing process of a general hard disk device, since a control card loading an EEP-ROM and a disk are separately manufactured, in order to save TPI information intrinsic to the disk in the EEP-ROM, management must be executed as to which control card and which disk in a product are combined, and the TPI information must be recorded in the EEP-ROM after the control card and the disk are loaded on the hard disk device. Consequently, the manufacturing process becomes complex.

SUMMARY OF THE INVENTION

The present invention is designed to solve the foregoing problems, and it is an object of invention to record servo patterns of a track pitch consistent with head characteristics of each product in a recording medium of a data storage device.

To achieve the aforementioned object, the present invention is constituted as a data storage device comprises: a disk-like recording medium having pitch information indicating a track pitch recorded in a predetermined area; a head for scanning the recording medium to read the pitch information; and read/write data from/in the recording medium by being subjected to seeking control based on the pitch information.

Herewith, preferably, the pitch information is recorded, in an area other than a data area of the recording medium, in a position to be always scanned by the head after power is turned on. For example, if the data storage device is provided with a load/unload mechanism as a mechanism for retreating the head from the recording medium, considering an operation when power is turned on, the pitch information can be recorded in a track positioned in an outer periphery of the data area. Since the pitch information is recorded in the recording medium and the seeking control is executed based on this pitch information, a value can be set for the track pitch, which is intrinsic to each data storage device product. Specifically, a data track can be set by a track pitch consistent with a writing width of a head of each product.

Moreover, in order to achieve the foregoing object, according to another aspect of the present invention, a data storage device is provided with a disk-like recording medium, and a head for scanning a data area of the recording medium to read/write data, and this head is used to write a servo pattern in the recording medium. That is, servo writing is executed by self-servo writing. Then, information regarding a track pitch is written in a predetermined position other than the data area.

More specifically, in the recording medium, the information regarding the track pitch can be written particularly in a sector ID part of the servo pattern in a predetermined area other than the data area. In this data storage device, the information regarding the track pitch is read after power is turned on and, based on this information, the head is subjected to seeking control to read/write data from/in the recording medium. By executing the seeking control based on the track pitch information of the recording medium itself recorded in the recording medium, a track pitch can be set for each data storage device product.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Next, the preferred embodiment of the present invention will be described in detail by taking an example of a hard disk device.

Figure 1:
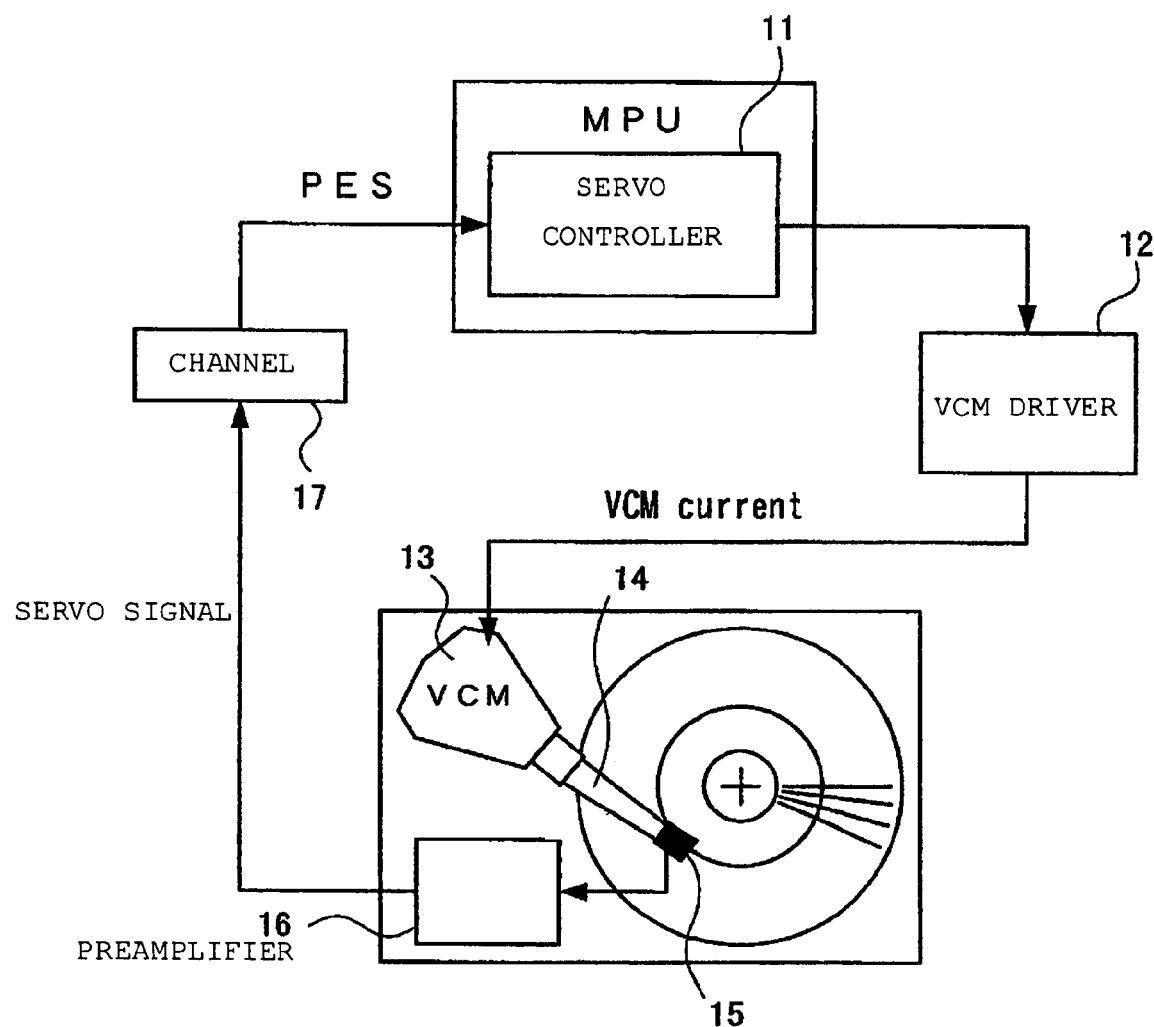
FIG. 1 is a view showing a servo control mechanism of a hard disk device.

FIG. 1 shows a servo control mechanism of a hard disk device.

Referring to FIG. 1, in the hard disk device of the embodiment, a servo loop is constituted of a servo controller 11, a VCM driver 12, a voice coil motor (VCM) 13, an actuator 14, a head 15, a preamplifier 16, and a channel 17.

The servo controller 11 is realized as a function of MPU to execute seeking control of the head 15 in accordance with a servo pattern written in a disk 20.

The VCM driver 12 outputs a VCM control signal (VCM current) based on control of the servo controller 11 to drive the VCM 13. Accordingly, the actuator 14 is turned and the head 15 seeks a desired track of the disk 20.

The head 15 feeds back a reading signal (servo signal) of the servo pattern written in the disk 20 as a position error signal (PES) through the preamplifier 16 and the channel 17 to the servo controller 11. Thus, the servo controller 11 can recognize whether correct positioning of the head 15 in the desired track is performed or not to reflect it on the seeking control.

Additionally, according to the embodiment, a load/unload mechanism is provided as means for retreating the head 15.

Figure 2:
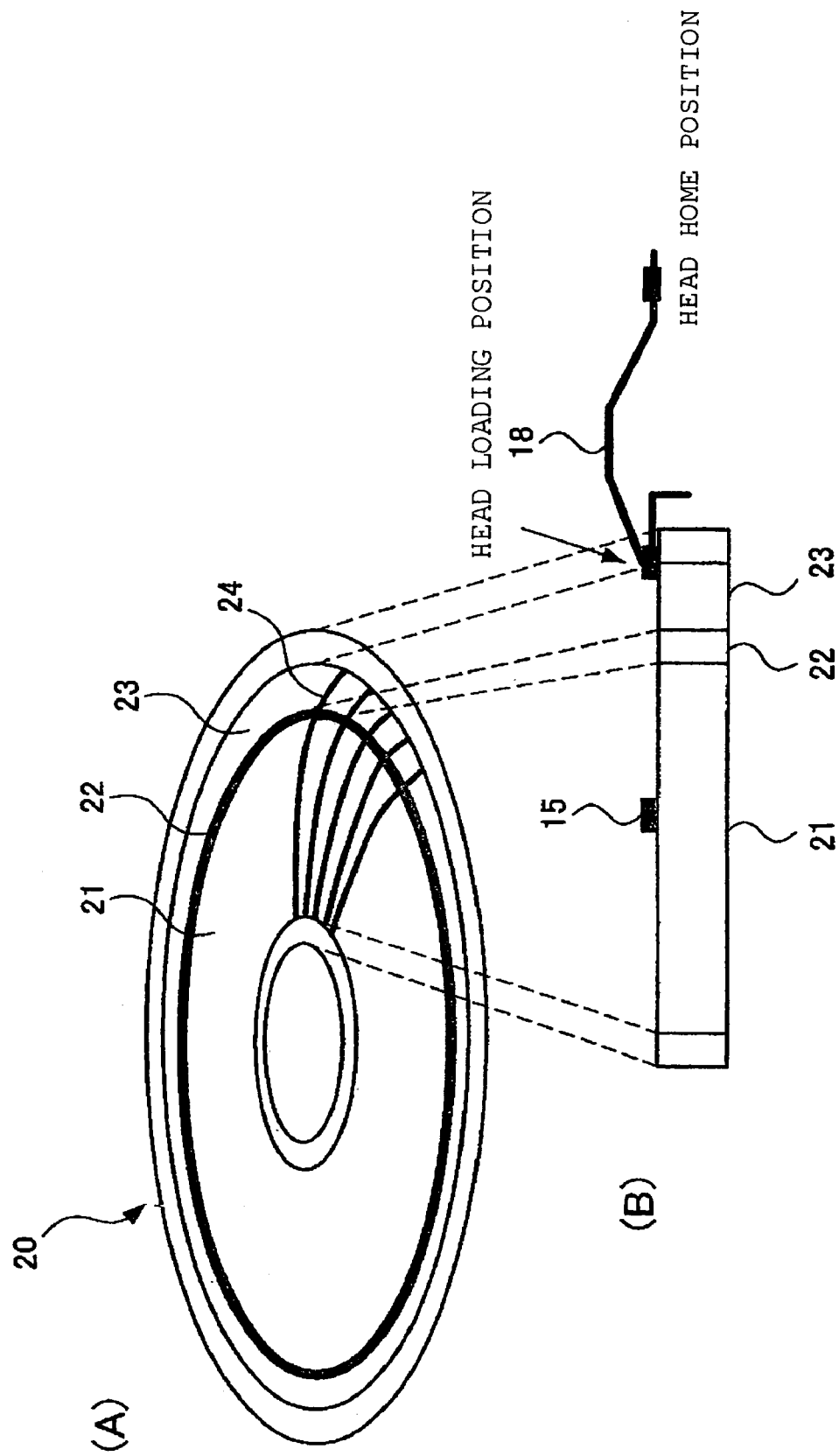
FIGS. 2(A) and 2(B) are views explaining a disk constitution for realizing servo control according an embodiment of the present invention.

FIGS. 2(A) and 2(B) explain a constitution of the disk 20. According to the embodiment, in the disk 20, a servo pattern of a track pitch consistent with a writing width of the head 15 is written by self-servo writing to form a track. Accordingly, a track pitch of the disk 20 takes a value intrinsic to a product of each hard disk device. In addition, in the disk 20, TPI ID which is information regarding the track pitch of the disk 20 is written.

In the load/unload mechanism, when the head 15 is retreated from the disk 20, the head 15 is retreated over a ramp to a head home position provided outside the disk 20. Thus, when power is turned on for the hard disk device, the head 15 is oppositely moved over the ramp above the disk 20. At this time, since there is a danger that the actuator 14 supporting the head 15 may touch the disk 20 to damage its surface, a guard area of a fixed width is formed outside the data area of the disk 20 for writing data. According to the embodiment, the TPI ID is written in this guard area.

Referring to FIG. 2(A), in the disk 20, there is a data area 21 for writing data, and a guard area 22 provided outside the data area 21. Furthermore, a part (area of fixed width) of the guard area 22 is a TPI ID embedded area 23 in which TPI ID is written. That is, the data area 21, the guard area 22 and the TPI ID embedded area 23 are concentrically formed. Additionally, in the disk 20, a servo pattern 24 is radially written over all the data area 21, the guard area 22, and the TPI ID embedded area 23.

As described above, in the hard disk device of the embodiment having the load/unload mechanism, the head 15 is moved from the head home position as a retreat position over the ramp 18 above the disk 20 at a head loading portion (see FIG. 2(B)). Accordingly, because of the formation of the TPI ID embedded area 23 in the cylinder outside the data area 21, the head 15 is moved above the disk 20 to first scan the TPI ID embedded area 23. Thus, the TPI ID is read to be sent to the servo controller 11, where the track pitch of the disk 20 is recognized to enable accurate seeking control.

Additionally, since the TPI ID embedded area 23 is formed in a place which was originally a guard area 22, as described above, there is a danger that the actuator 14 may touch the disk 20 to damage the disk 20. However, the TPI ID is data of a small size, and written in a plurality of places of the TPI ID embedded area 23 as described later. Actually, therefore, a possibility of total inability to read the TPI ID due to the damaged surface of the disk 20 is so small that it can be ignored.

According to the embodiment, the TPI ID is written in the servo pattern 24 of the TPI ID embedded area 23. Servo information indicated by the servo pattern 24 is constituted of four parts, i.e., a servo address mark, a cylinder ID, a sector ID and a burst pattern. Among them, the servo address mark and the cylinder ID are used to determine whether the servo pattern 24 is stably found or not in the TPI ID embedded area 23. The sector ID is not necessary in the TPI ID area 23 in which no data are written. The burst pattern for acquiring PES is not suitable for storing the TPI ID because the pattern is an analog amount.

Thus, the TPI ID is embedded in the sector ID description place of the servo pattern 24 in the TPI ID embedded area 23.

Figure 3:
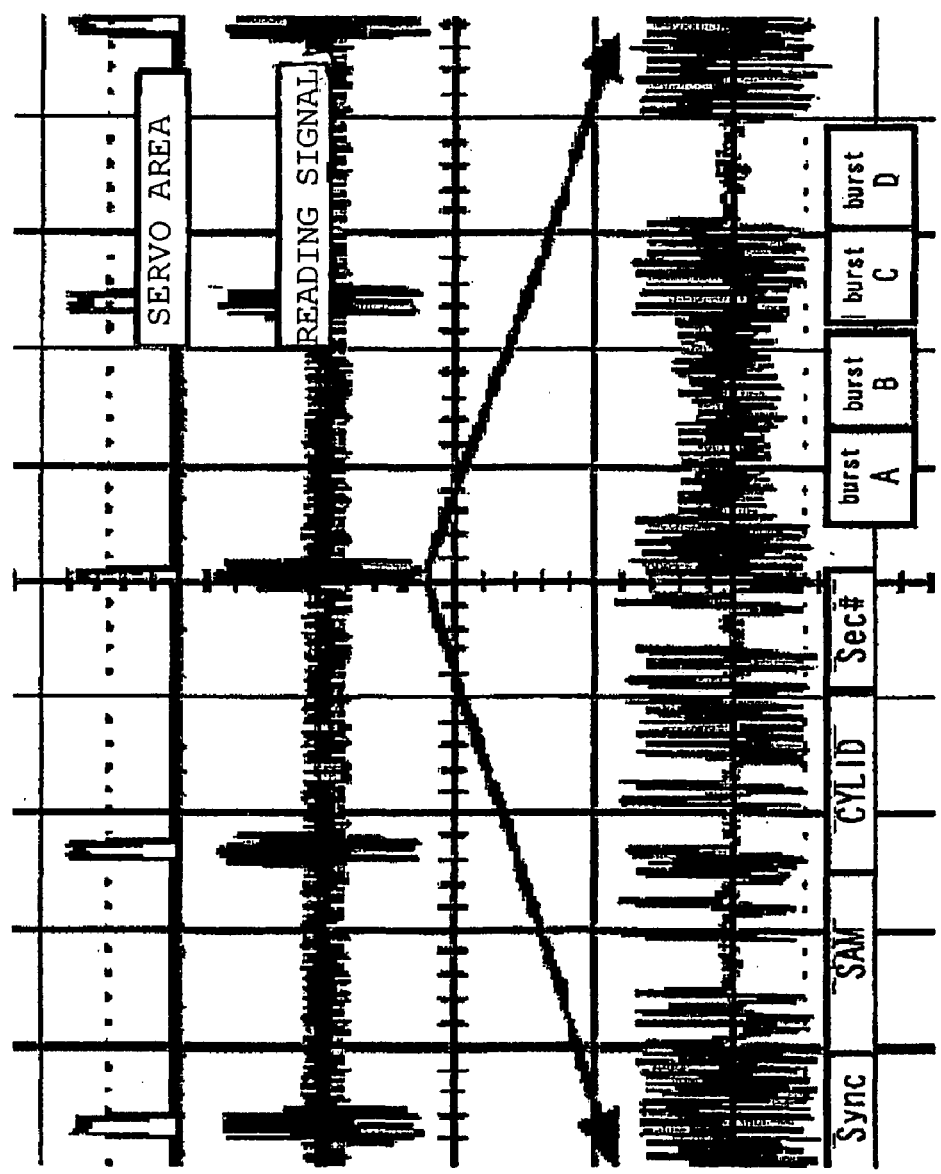
FIG. 3 is a view showing a reading signal (waveform) of a servo pattern.

FIG. 3 shows a reading signal (waveform) of the servo pattern.

In FIG. 3, a first stage is a signal indicating a position where the servo pattern 24 is written, and a second stage is a reading signal of the servo pattern 24. A third stage shows an extended content of the reading signal of one servo pattern 24 among signals of the second stage.

Among signals of the third stage in FIG. 3, a part "Sec#" is a sector ID description place, where the TPI ID is embedded.

Figure 4:
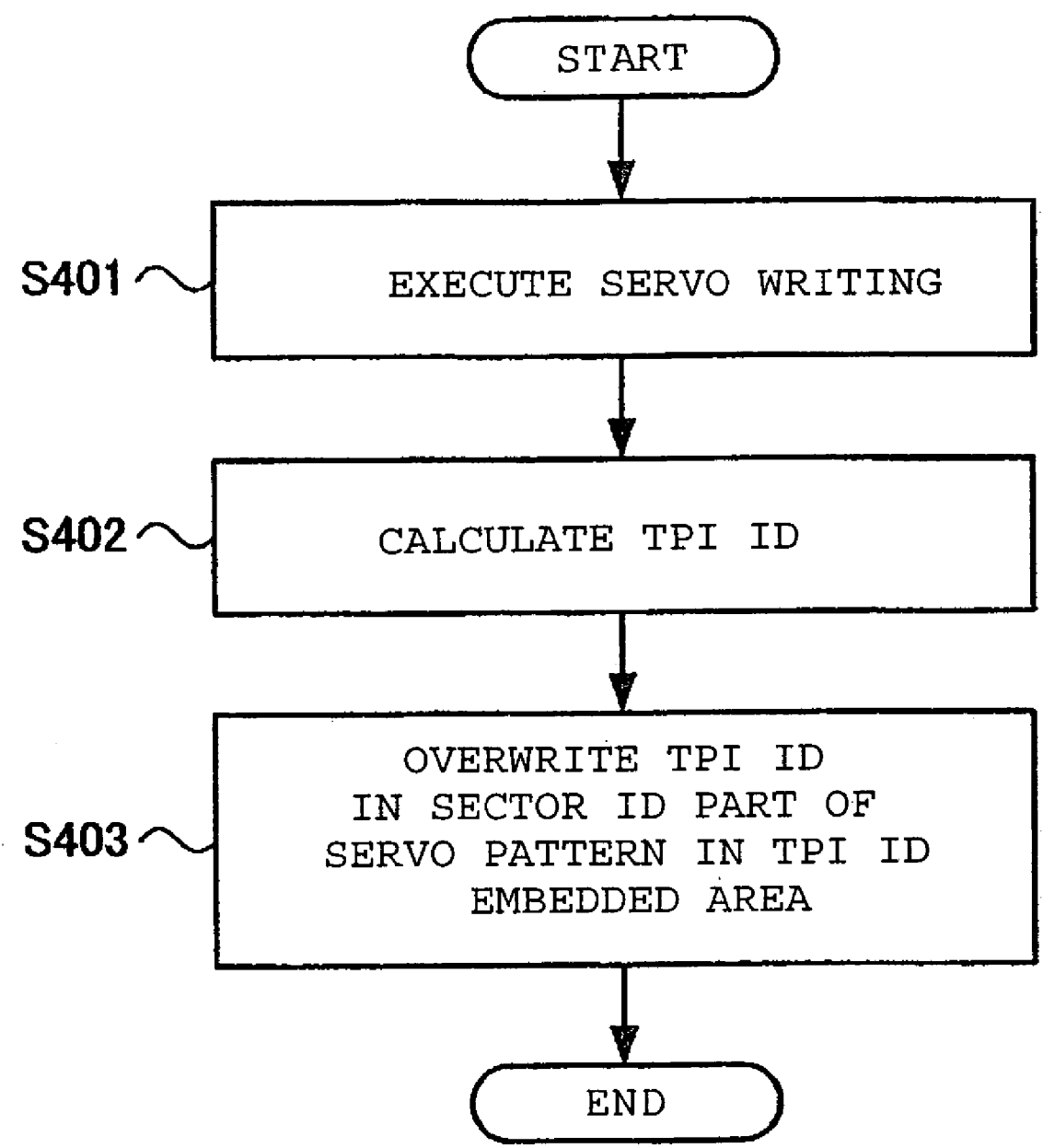
FIG. 4 is a flowchart explaining a servo writing process according to the embodiment.

FIG. 4 is a flowchart explaining a servo writing process according to the embodiment.

In the hard disk device of the embodiment, by self-servo writing, the head 15 is used to write the servo pattern 24 in the disk 20. As shown in FIG. 4, in the hard disk device, servo writing is first executed from the inside to the outside of the disk 20 by the head 15, and the servo writing is finished in the ramp position of the outside (head loading position) (step 401). Then, the TPI ID is calculated (step 402).

At this time, since the positions (radius) of the inside and the outside of the disk is predetermined, if the number of cylinders in which servo writing is executed is N, and a distance from the start of writing the servo pattern 24 to the ramp (total length of one servo pattern 24) is Lm), then TPI can be known by a following equation 1.

$$(\text{actual } TPI) = 25.4 \times N/L \quad \text{(Equation 1)}$$

Then, TPI ID is calculated by a following equation 2.

$$TPI\ ID = \int (\text{actual } TPI) \times \text{scaling} \quad \text{(Equation 2)}$$

Herein, scaling denotes a parameter decided by considering the number of bits for a sector ID or a expected variance in TPI, and a fixed value is set for each product.

The above calculations can be executed by a host computer connected to the hard disk device in servo writing.

Lastly, in the hard disk device, by the head 15, the TPI ID calculated in step 402 is overwritten in the sector ID part of the servo pattern 24 in the TPI ID embedded area 23 set outside the data area 21 (step 403).

Figure 5:
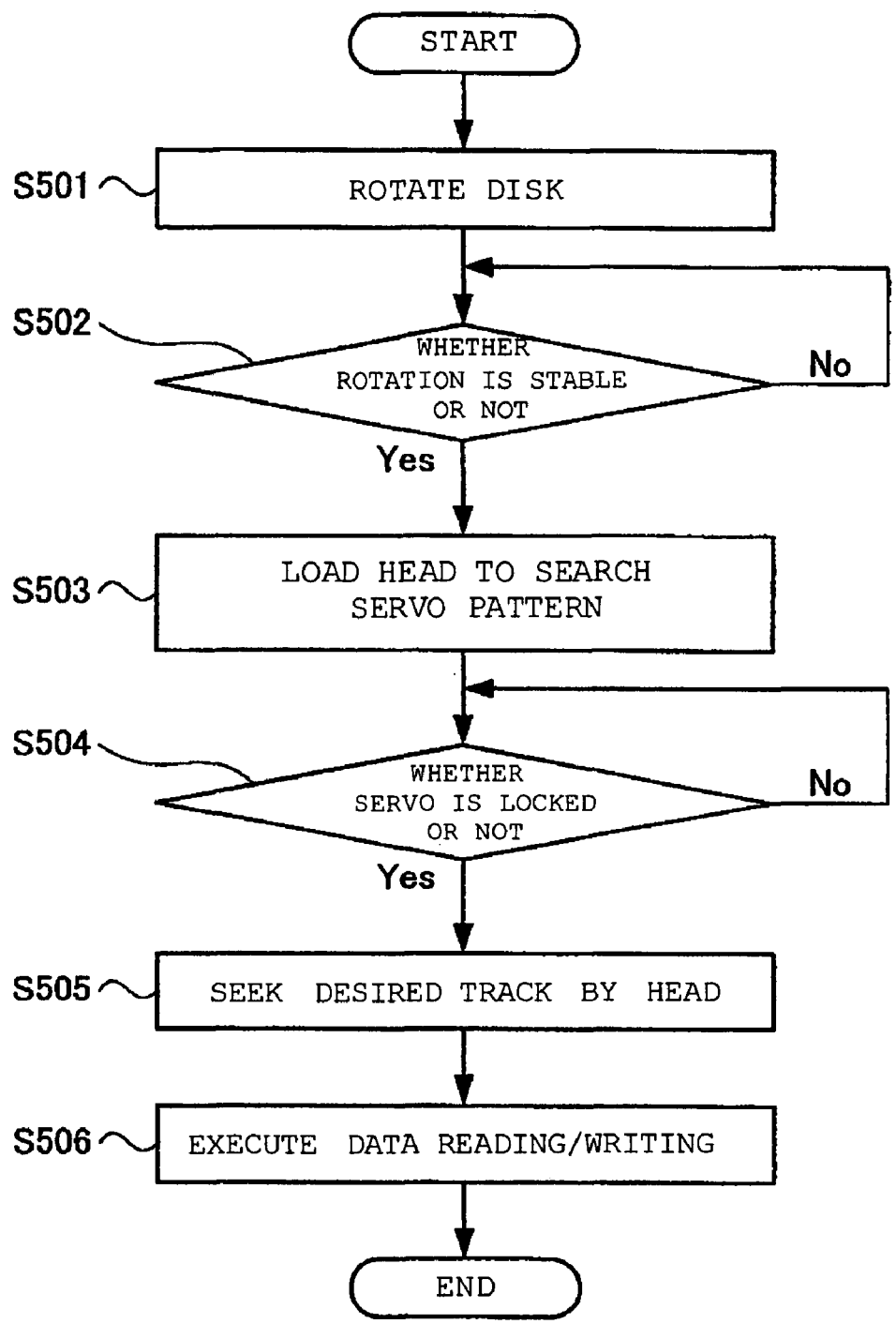
FIG. 5 is a flowchart explaining an operation when power is turned on for a hard disk device of the embodiment.

FIG. 5 is a flowchart explaining an operation when power is turned on for the hard disk device provided with the loading/unloading device of the embodiment.

As shown in FIG. 5, when power is turned on for the hard disk device, at first the hard disk device rotates the disk 20 (step 501). When the disk 20 becomes stable at a desired rotation speed, the head 15 is moved above the disk 20 (loading) to search for the servo pattern 24 (steps 502 and 503). Then, when a state is set where the servo pattern 24 is stably found (servo locking), a seeking operation is executed (steps 504, 505) to read/write data in a desired address (track) (step 506).

In a series of the foregoing operations, after the movement of the head 15 above the disk 20 until the state is set where the servo pattern 24 is stably found, servo information of the servo pattern 24 written in the cylinder in the outside area of the disk 20 (i.e., TPI ID embedded area 23) is read. Thus, by embedding the TPI ID as a part of the servo information in this place beforehand, information regarding the track pitch intrinsic to the disk 20 can be obtained before the start of the seeking operation.

As described above, according to the embodiment, by embedding the information regarding the track pitch in the disk 20 itself, the writing of the servo pattern 24 in the disk 20 by the track pitch individually consistent with the writing width as one of the characteristics of the head 15 is realized. The writing of the servo pattern 24 is executed by a self-servo writing method and using the head 15. Accordingly, the embodiment can be realized by the existing device constitution.

Incidentally, if a track pitch of the servo pattern 24 and a track pitch of a data track are independent of each other, it is not always necessary to make the track pitch of the servo pattern 24 consistent with the writing width of the head 15. That is, since it is preferable that the servo pattern 24 is written to be easily read by the head 15, a reading width is considered as one of the characteristics of the head 15, and the servo pattern 24 can be written by a track pitch individually consistent with the reading width.

Furthermore, according to the embodiment, the TPI ID embedded area 23 is set outside the data area 21. Accordingly, in the hard disk device provided with the load/unload mechanism, the TPI can be read before the head 15 scans the data area 21, and efficient transition can be made to seeking control. However, the purpose of the present invention is to write information regarding a track pitch in a predetermined position on the disk 20 always scanned by the head 15 after power is turned on for the hard disk device, and the position written is not always limited to the outside of the data area 21. For example, in a hard disk device provided with a contact start stop (CCS) mechanism as a mechanism for retreating the head 15 from the data area 21, it may be more efficient to set the TPI ID embedded area 23 inside the data area 21. Hence, such a constitution can be employed.

As described above, according to the present invention, it is possible to record the servo patterns of a track pitch consistent with head characteristics in the recording medium of the data storage device.

Although the preferred embodiments of the preferred invention have been described in detail, it should be understood that various changes, substitutions and alternations can be made therein without departing from spirit and scope of the inventions as defined by the appended claims.

What is claimed is:

1. A magnetic data storage device comprising: a disk-like recording medium having pitch information indicating a track pitch recorded in a predetermined area in a servo area, wherein the pitch information is written by a head consistent with the characteristics of the head; and the head for scanning the recording medium to read the pitch information, and reading/writing data from/in the recording medium by being subjected to seeking control based on the pitch information, wherein the recording medium has, in an area other than a data area, the pitch information recorded in a position to be scanned by the head without fail after power is turned on.

2. A magnetic data storage device comprising: a disk-like recording medium; and a head for scanning a data area of the recording medium to read/write data, wherein the head writes a servo pattern in the recording medium, and information regarding a track pitch in a predetermined position in the servo pattern other than the data area, wherein the information regarding the track pitch is consistent with the characteristics of the head.

3. The data storage device according to claim 2, wherein the head writes the information regarding the track pitch in the servo pattern in a predetermined area other than the data area.

4. The data storage device according to claim 2, wherein the head scans the predetermined position of the recording medium to read the information regarding the track pitch after power is turned on for the data storage device, and reads/writes information from/in the recording medium by being subjected to seeking control based on the information.

5. A disk-like magnetic recording medium of a data storage device in which a head scans a data track of the recording medium to read/write data, comprising: a data area including a data track provided by a track pitch consistent with characteristics of the head, and a pitch information recording area having information regarding the track pitch recorded, wherein the information regarding the track pitch is recorded in a servo pattern written in the pitch information recording area by the head.

6. A servo writing method for writing a servo pattern in a disk-like magnetic recording medium, comprising: the steps of: writing a servo pattern in the disk; and writing, in an area other a data area for recording data, information indicating a track pitch in a position to be scanned by a head without fail after power is turned on for a data storage device, wherein the information indicating a track pitch is consistent with characteristics of the head.

7. The servo writing method according to claim 6, wherein in the step of writing the information indicating the track pitch, the information is written in an outer periphery of the data area.

8. The servo writing method according to claim 6, wherein in the step of writing the information indicating the track pitch, the information is written in the servo pattern.

9. A data reading/writing method of a magnetic data storage device for scanning a data track of a magnetic recording medium by a head to read/write data, comprising the steps of: reading pitch information indicating a track pitch recorded in a predetermined area of the recording medium by the head; executing seeking by control based on the read pitch information; and reading/writing data from/in a predetermined track of the recording medium which is seeking destination, wherein in the step of reading the pitch information, the pitch information recorded in a servo pattern written in an area other than a data area of the recording medium is read; and the pitch information is recorded by the head with consistency to the characteristics of the head.

* * * * *